United States Patent
Ho

(10) Patent No.: US 7,661,007 B2
(45) Date of Patent: Feb. 9, 2010

(54) METHODS AND SYSTEMS FOR ADJUSTING CLOCK FREQUENCY

(75) Inventor: Kuan-Jui Ho, Taipei (TW)

(73) Assignee: Via Technologies, Inc., Hsin-Tien, Taipei (TW)

( * ) Notice: Subject to any disclaimer, the term of this patent is extended or adjusted under 35 U.S.C. 154(b) by 471 days.

(21) Appl. No.: 11/611,323

(22) Filed: Dec. 15, 2006

(65) Prior Publication Data

US 2008/0082854 A1 Apr. 3, 2008

Related U.S. Application Data

(60) Provisional application No. 60/827,224, filed on Sep. 28, 2006.

(51) Int. Cl.
*G06F 1/26* (2006.01)

(52) U.S. Cl. ............... 713/400; 713/401; 713/600; 713/601; 713/300; 713/321; 713/322; 713/323; 713/324; 713/330; 713/340

(58) Field of Classification Search ............... 713/300, 713/320–324, 330, 340, 400–401, 600–601
See application file for complete search history.

(56) References Cited

U.S. PATENT DOCUMENTS

| 6,754,837 | B1 * | 6/2004 | Helms ............... 713/322 |
| 6,949,918 | B2 * | 9/2005 | Clark et al. ............ 323/351 |
| 7,398,407 | B2 * | 7/2008 | Jorgenson et al. ...... 713/322 |
| 2003/0210026 | A1 * | 11/2003 | Clark et al. ............ 323/351 |
| 2006/0136763 | A1 * | 6/2006 | Jorgenson et al. ...... 713/322 |
| 2008/0263382 | A1 * | 10/2008 | Jorgenson et al. ...... 713/501 |

FOREIGN PATENT DOCUMENTS

JP  2005025397  1/2005

OTHER PUBLICATIONS

English abstract of JP2005025397, pub. Jan. 27, 2005.

* cited by examiner

*Primary Examiner*—Abdelmoniem Elamin
(74) *Attorney, Agent, or Firm*—Thomas, Kayden, Horstemeyer & Risley

(57) ABSTRACT

A method for adjusting clock frequency is disclosed. The method includes halting a central processing unit (CPU) while tuning a clock frequency, thereby enabling multiple clock signals with the tuned clock frequency to be generated.

19 Claims, 9 Drawing Sheets

METHODS AND SYSTEMS FOR ADJUSTING CLOCK FREQUENCY

BACKGROUND

The invention relates to clock generation, and more particularly, to methods and systems for adjusting clock frequency.

A clock generator is a circuit that produces a timing signal (known as a clock signal) for use in synchronizing operation of at least two hardware circuits. A clock generator generates symmetrical square waves to a number of electronic devices, such as central processing unit, north-bridge controller, south-bridge controller or others, to synchronize operations between these electronic devices. The clock generator can be configured to increase or decrease clock frequency.

SUMMARY

Methods for adjusting clock frequency are disclosed. An embodiment of a method for adjusting clock frequency includes the following steps. A central processing unit (CPU) is halted while tuning a clock frequency, thereby enabling generation of multiple clock signals with the tuned clock frequency.

Systems for adjusting clock frequency are provided. An embodiment of a system for adjusting clock frequency comprises a CPU and a chipset connecting to the CPU and comprising a south-bridge. The south-bridge comprises a microcontroller. The CPU is halted while the microcontroller tunes a clock frequency, thereby enabling to generate multiple clock signals with the tuned clock frequency.

BRIEF DESCRIPTION OF DRAWINGS

The invention will become more fully understood by referring to the following detailed description with reference to the accompanying drawings, wherein.

DETAILED DESCRIPTION

Figure 1:
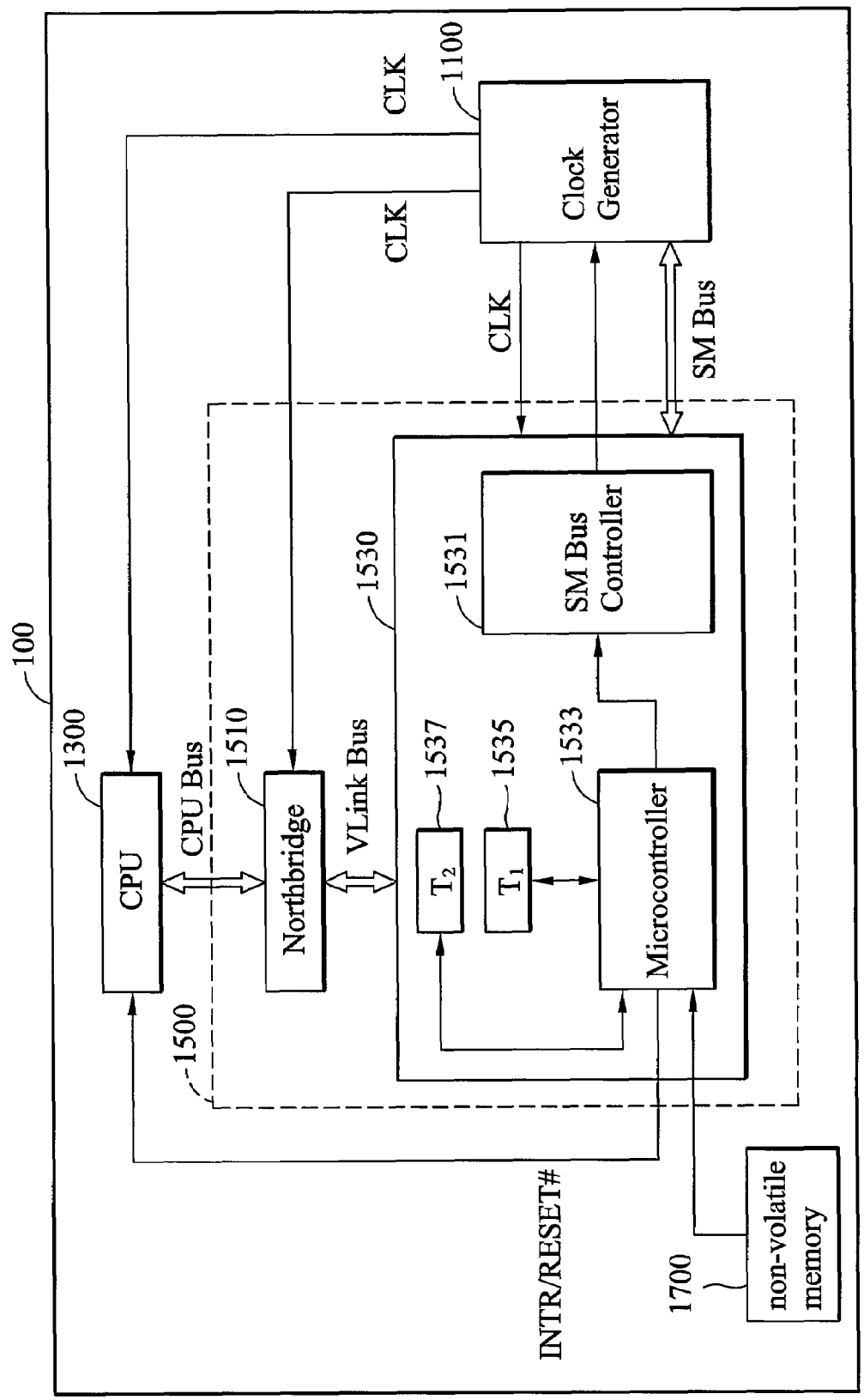
FIG. 1 is a diagram of a hardware environment of a system for adjusting clock frequency.

FIG. 1 is a diagram of a hardware environment of a system for adjusting clock frequency 100 comprising a clock generator 1100, a central processing unit (CPU) 1300, a chipset 1500 and a non-volatile memory 1700. The chipset 1500 typically comprises a north-bridge 1510 and a south-bridge 1530. The north-bridge 1510, a controller, typically handles communications between the CPU 1300, memory (not shown), AGP (accelerated graphics port, not shown) or PCI express, and the southbridge 1530. The north-bridge 1510 connects to the CPU 1300 by CPU bus, and to the south-bridge 1530 by VLink bus. The south-bridge 1530 connects to the clock generator by SM Bus, known as system management bus. The clock generator 1100 generates symmetrical square waves (i.e. clock signals) with a frequency to the CPU 1300, north-bridge 1510 and south-bridge 1530, to synchronize operations therebetween. The south-bridge 1530 comprises a SM bus controller 1531, a microcontroller 1511, two timers 1535 and 1537. A BIOS (basic input output system), a computer program, is executed by the CPU 1300 to direct the chipset 1500 to perform various tasks including adjusting clock frequency.

Figure 2A:
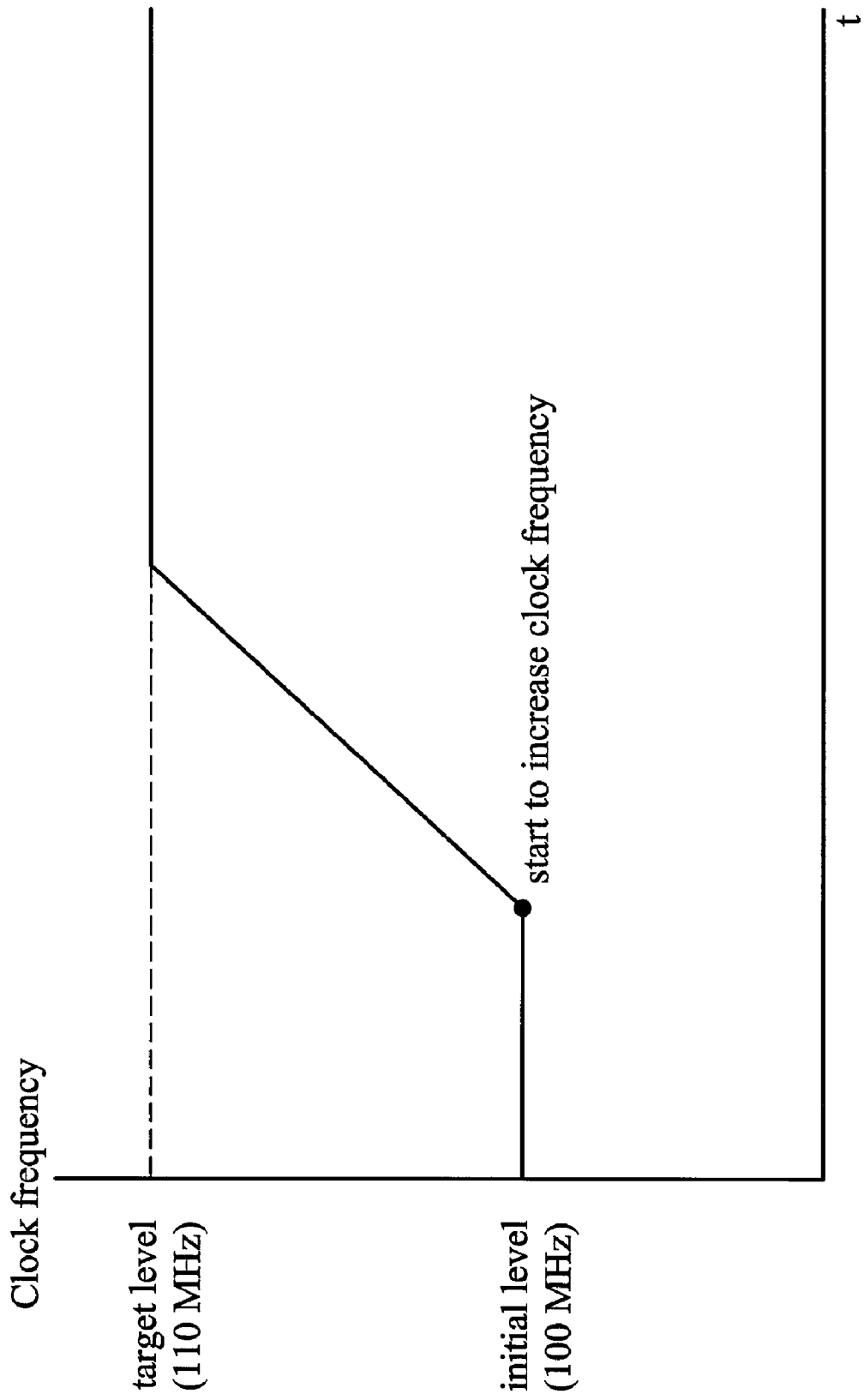
FIG. 2a is a diagram illustrating exemplary frequency variations when a clock generator increasing clock frequency.
Figure 2B:
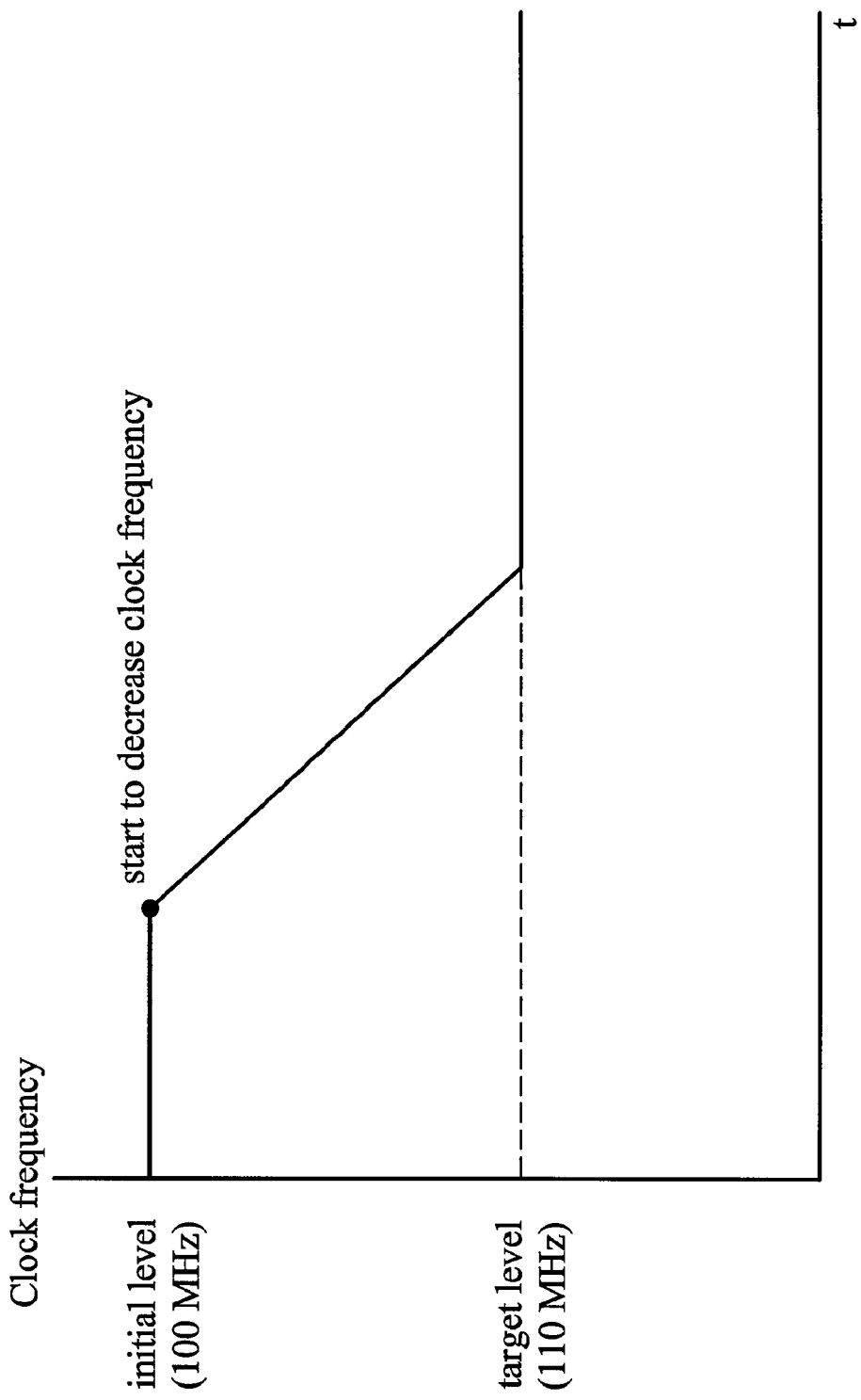
FIG. 2b is a diagram illustrating exemplary frequency variations when a clock generator decreasing clock frequency.
Figure 3:
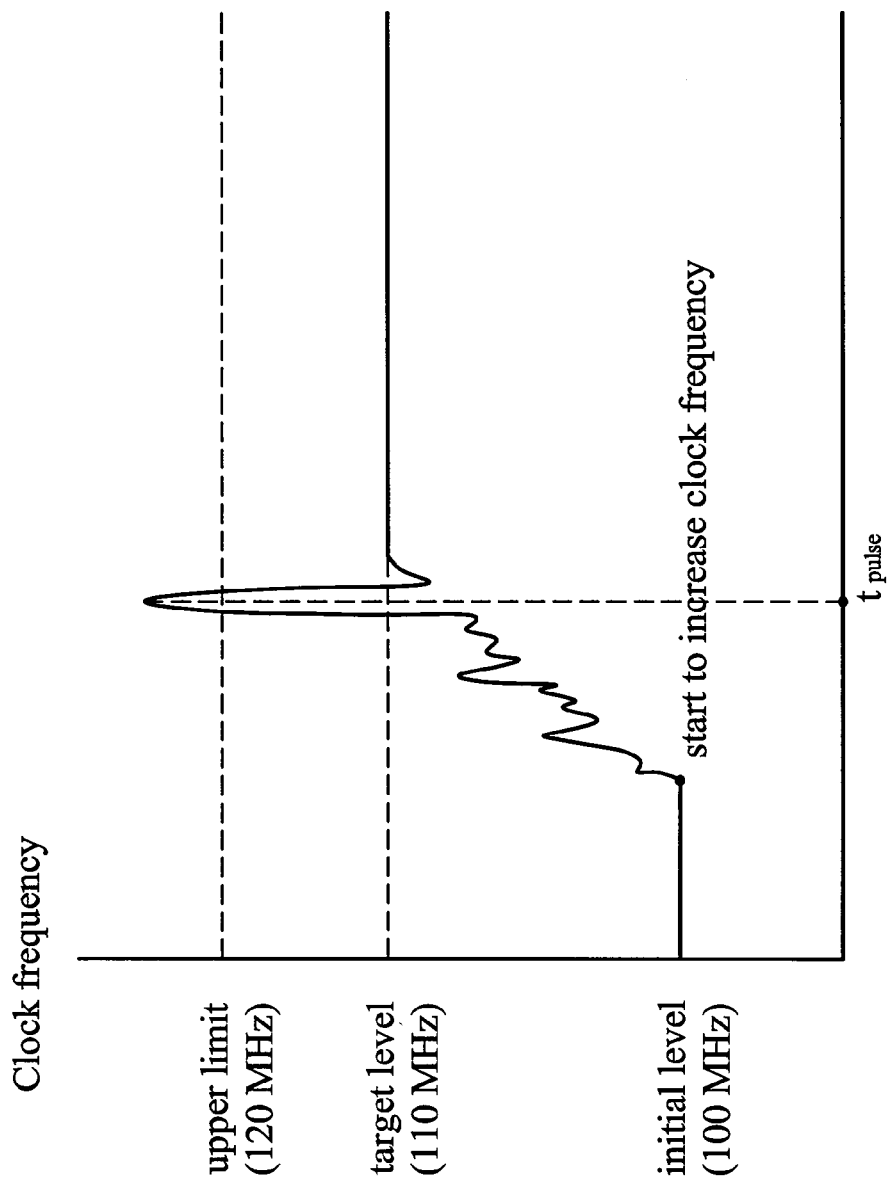
FIG. 3 is a diagram illustrating exemplary frequency variations tracked by a chipset when a clock generator increasing clock frequency.

When the SM bus controller 1531 issues a series of commands to the clock generator 1100 to increase or decrease clock frequency to a target level, the frequency of clock signals generated by the clock generator 1100 is smoothly increased or decreased to the target level as shown in FIG. 2a or FIG. 2b. After issuing the commands to increase or decrease clock frequency, a PLL (phase-lock loop, not shown) disposed on the chipset 1500 tracks the frequency of clock signals generated by the generator 1100. Jitters may be introduced by the chipset 1500 while tracking increasing clock signal frequencies of. FIG. 3 is a diagram illustrating exemplary frequency variations tracked by the chipset 1500. When introducing an excessive jitter as shown in $t_{pulse}$ of FIG. 3, the tracking frequency may exceed an upper limit, resulting in malfunction of the chipset 1500. That is, in the meantime, the chipset 1500 fails to execute commands issued by the CPU 1300 to perform particular tasks, resulting in an unexpected system shutdown.

Figure 4:
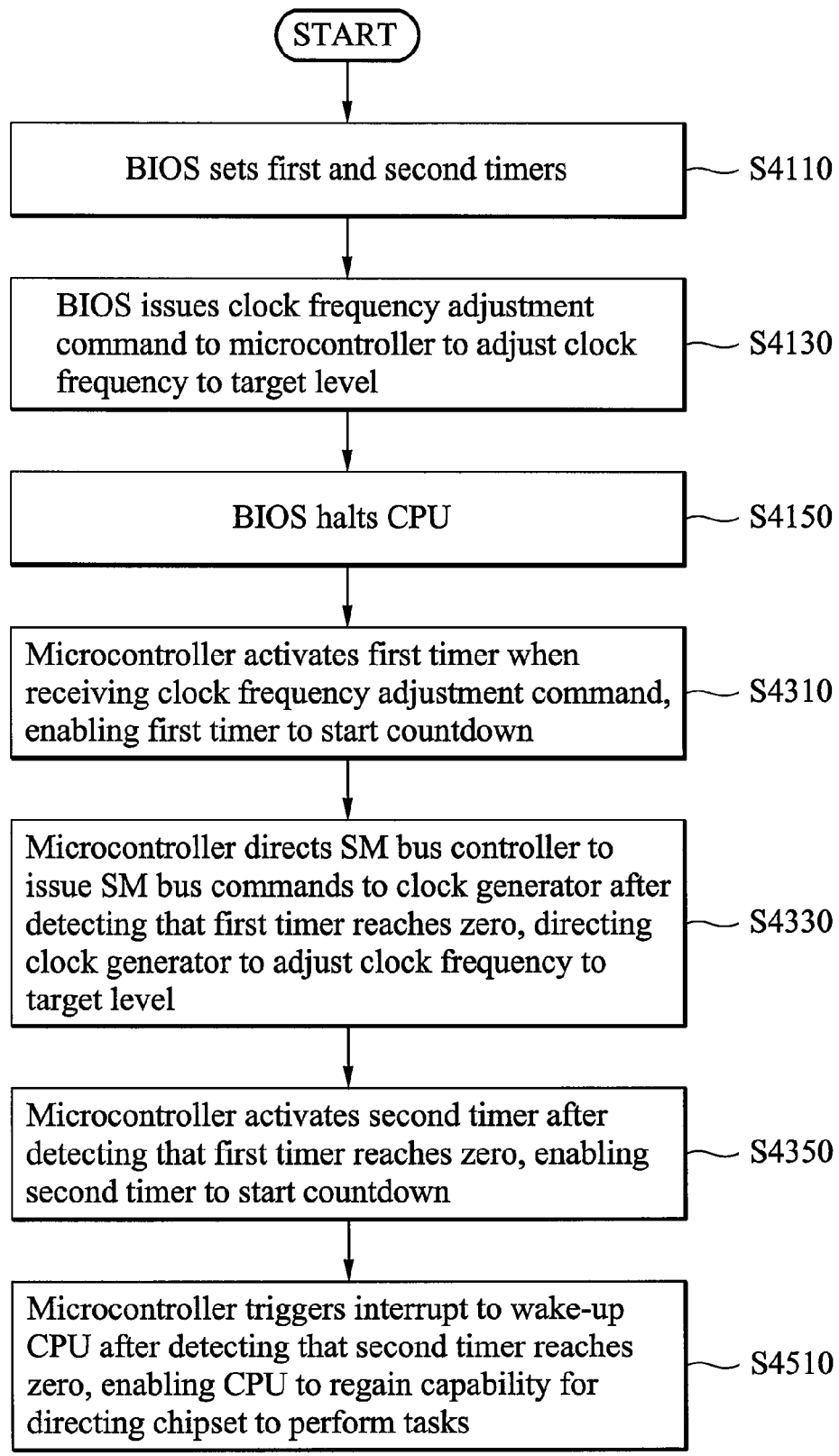
FIG. 4 is a flowchart illustrating a first embodiment of a method for adjusting clock frequency.

In order to avoid unexpected system shutdown, the invention halts the CPU 1300 while the chipset 1500 tracks clock frequency during adjustment (e.g. increased or decreased) by the clock generator 1100. FIG. 4 is a flowchart illustrating a first embodiment of a method for adjusting clock frequency. In step S4110, timers 1535 and 1537 (FIG. 1) are set by the BIOS executed by the CPU 1300 (FIG. 1). In step S4130, a clock frequency adjustment command is issued to the microcontroller 1533 in order to adjust (e.g. increase or decrease) clock frequency to a target level by the BIOS. In step S4150, the CPU 1300 is halted by the BIOS. Note that, when the CPU 1300 halts, the CPU 1300 can not issue any commands to direct the chipset 1500 to perform a particular task, thus, unexpected system shutdown while the chipset 1500 tracks clock frequency during adjustment by the clock generator 1100 (FIG. 1) is prevented. In step S4310, the timer 1535 is activated by the microcontroller 1533 when receiving the clock frequency adjustment command, enabling the timer 1535 to start countdown. In step S4330, the SM bus controller 1531 is directed to issue a series of SM bus commands to the clock generator 1100 by the microcontroller 1533 after detecting that the timer 1535 reaches zero, directing the clock generator 110 to adjust clock frequency to the target level. Note that the timer 1535 is set to a relevant time, for example, about ten milliseconds (ms), by the BIOS in order to ensure that the BIOS can successfully halt the CPU 1300 before the timer 1535 reaches zero. In step S4350, the timer 1537 is activated by the microcontroller 1533 after detecting that the timer 1535 reaches zero, enabling the timer 1537 to start counting down. Note that the timer 1537 is set to a relevant time, for example, about twenty ms, by the BIOS in order to ensure that the clock generator 1100 can successfully adjust the clock frequency to the target level before the timer 1537 reaches zero. It is to be understood that the steps S4330 and S4350 may be simultaneously executed, or the S4350 may be executed prior to the step S4330. In step S4510, an interrupt is triggered by the microcontroller 1533 in order to wake-up the CPU 1300 after detecting that the timer 1537 reaches zero, enabling the CPU 1300 to regain capability for directing the chipset 1500 to perform tasks.

Figure 5:
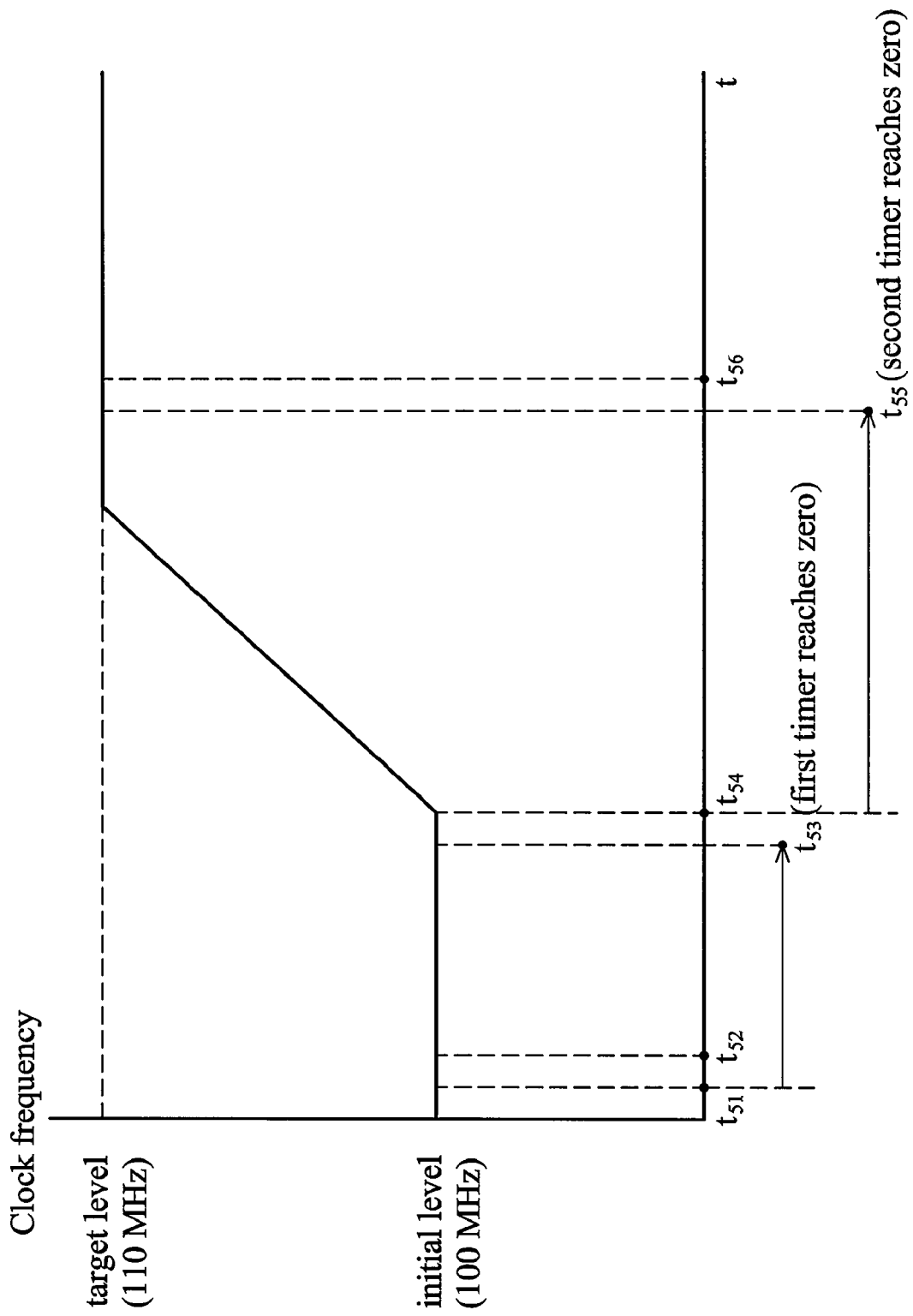
FIG. 5 is a diagram illustrating exemplary frequency adjustment by a clock generator with reference to the first embodiment as shown in FIG. 4.

FIG. 5 is a diagram illustrating exemplary frequency adjustment by the clock generator 1100 with reference to the first embodiment as shown in FIG. 4. For example, steps S4110 is performed before a time $t_{51}$ to set timers 1535 and 1537 (FIG. 1). Steps S4130 and S4310 are performed at the time $t_{51}$ to activate the timer 1535. The timer 1535 reaches zero at a time $t_{53}$. Step S4150 is performed at a time $t_{52}$ between a countdown duration by the timer 1535, $t_{51}$ and $t_{53}$. Steps S4330 and S4350 are performed at a time $t_{54}$ to activate the timer 1537 and direct the clock generator 110 (FIG. 1) to adjust clock frequency to a target level. The timer 1537 reaches zero at a time $t_{55}$. The clock frequency is successfully adjusted before the $t_{55}$. Step S4510 is performed at a time $t_{56}$ to wake-up the CPU 1300.

Figure 6:
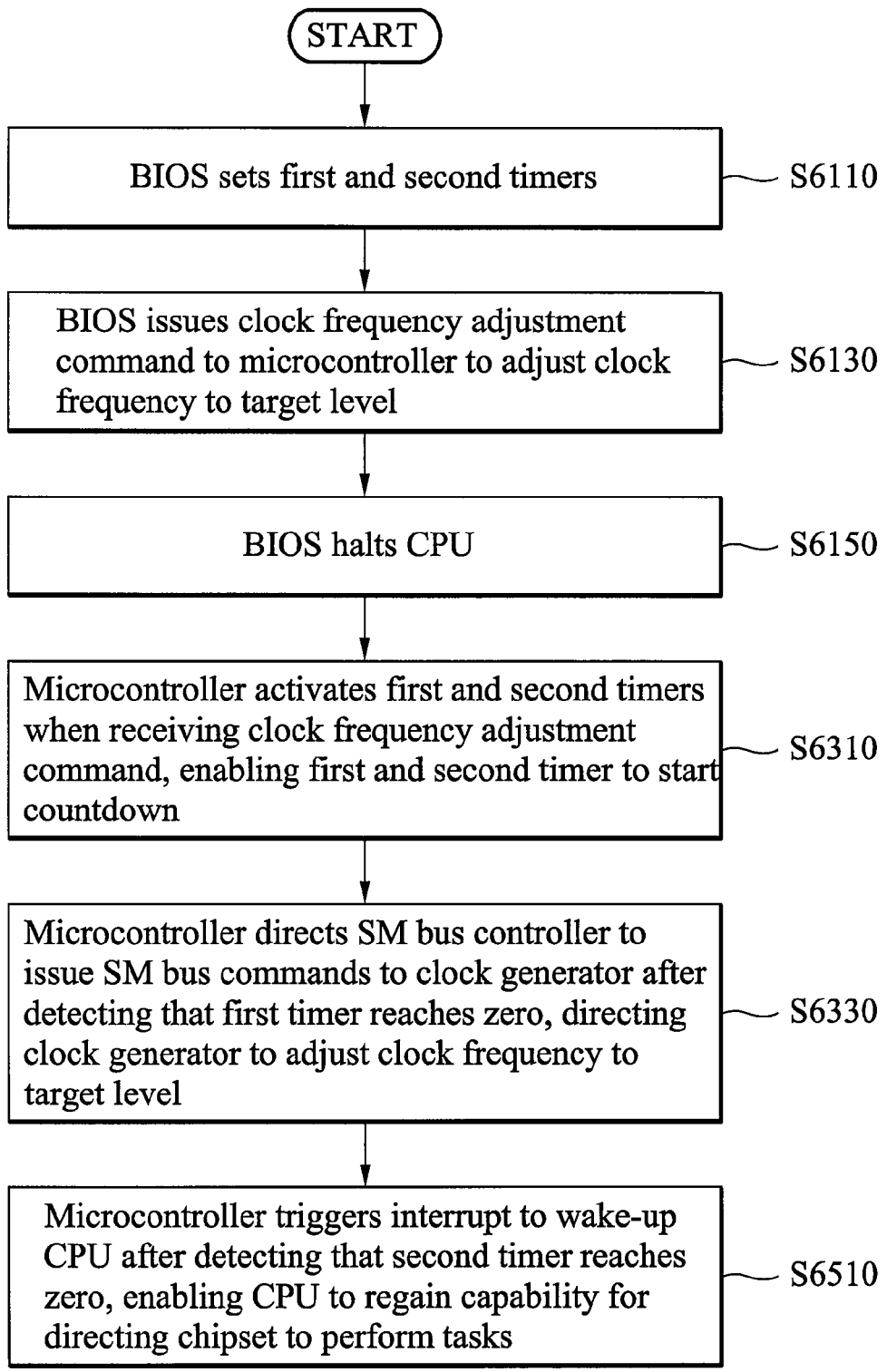
FIG. 6 is a flowchart illustrating a second embodiment of a method for adjusting clock frequency.

FIG. 6 is a flowchart illustrating a second embodiment of a method for adjusting clock frequency. In step S6110, timers 1535 and 1537 (FIG. 1) are set by the BIOS executed by the CPU 1300 (FIG. 1). The details of steps S6130 to S6150 may follow the description of steps S4130 and S4150, and are only briefly described herein. The difference between this and the first embodiment as shown in FIG. 4, is the timer 1537 is set to a relevant time, for example, about thirty-five milliseconds (ms), by the BIOS in order to ensure that the BIOS can successfully halt the CPU 1300 and the clock generator 1100 can successfully adjust the clock frequency to the target level before the timer 1537 reaches zero. In step S6310, the timers 1535 and 1537 are simultaneously activated by the microcontroller 1533 after receiving the clock frequency adjustment command, enabling the timers 1535 and 1537 to start countdown. The details of steps S6330 and S6510 may follow the description of steps S4330 and S4510, and are only briefly described herein.

Figure 7:
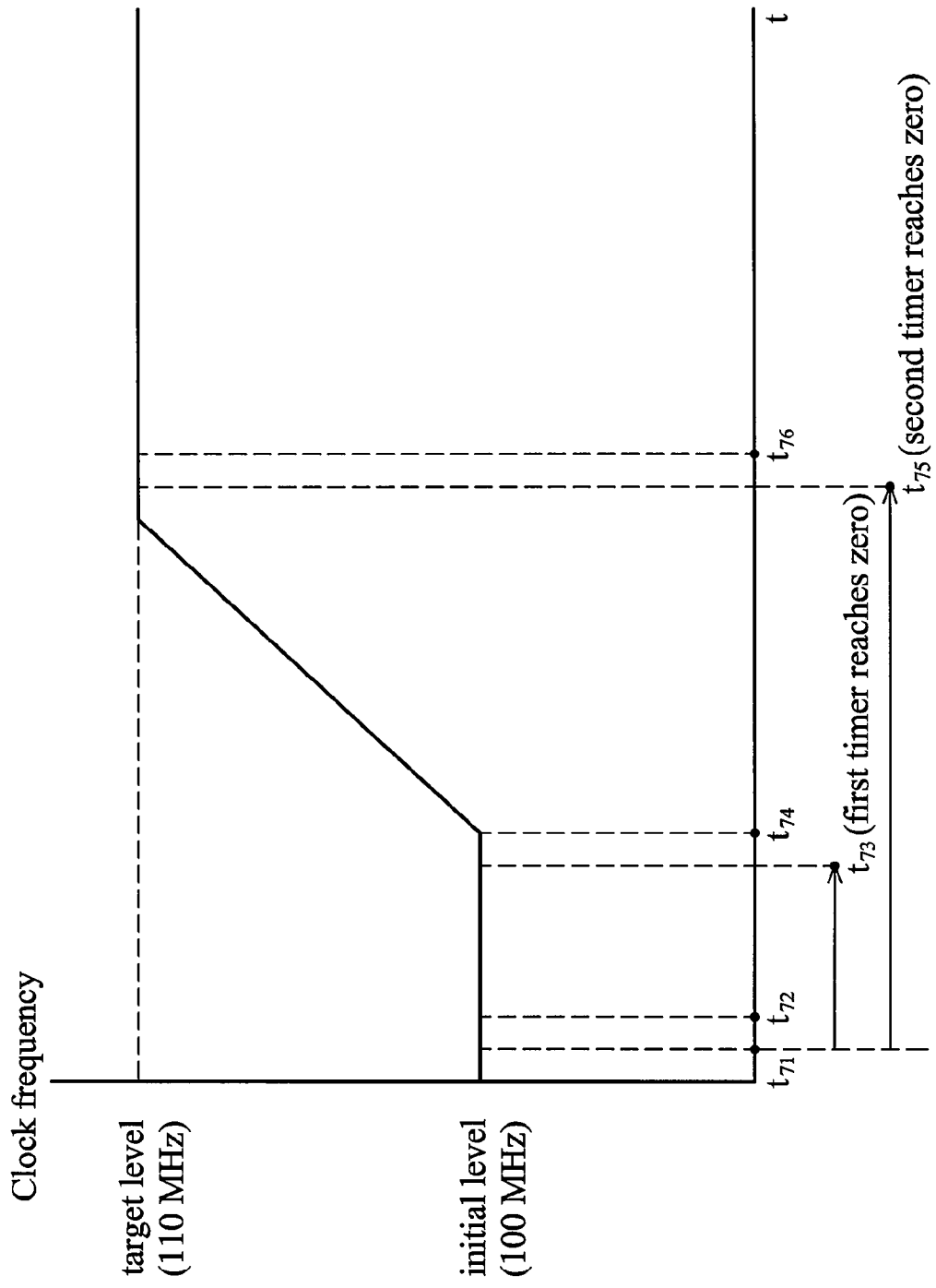
FIG. 7 is a diagram illustrating exemplary frequency adjustment by a clock generator with reference to the second embodiment as shown in FIG. 6.

FIG. 7 is a diagram illustrating exemplary frequency adjustment by the clock generator 1100 with reference to the second embodiment as shown in FIG. 6. For example, step S6110 is performed before a time $t_{71}$ to set timers 1535 and 1537 (FIG. 1). Steps S6130 and S6310 are performed at the time $t_{71}$ to activate the timers 1535 and 1537. The timer 1535 reaches zero at a time $t_{73}$, and the timer 1537 reaches zero at a time $t_{75}$. Step S6150 is performed at a time $t_{72}$ between a countdown duration by the timer 1535, $t_{71}$ and $t_{73}$. Step S6330 is performed at a time $t_{74}$ to direct the clock generator 110 (FIG. 1) to adjust clock frequency to a target level. The clock frequency is successfully adjusted before between a countdown duration by the timer 1537, $t_{71}$ and $t_{75}$. Step S6510 is performed at a time $t_{76}$ to wake-up the CPU 1300.

Figure 8:
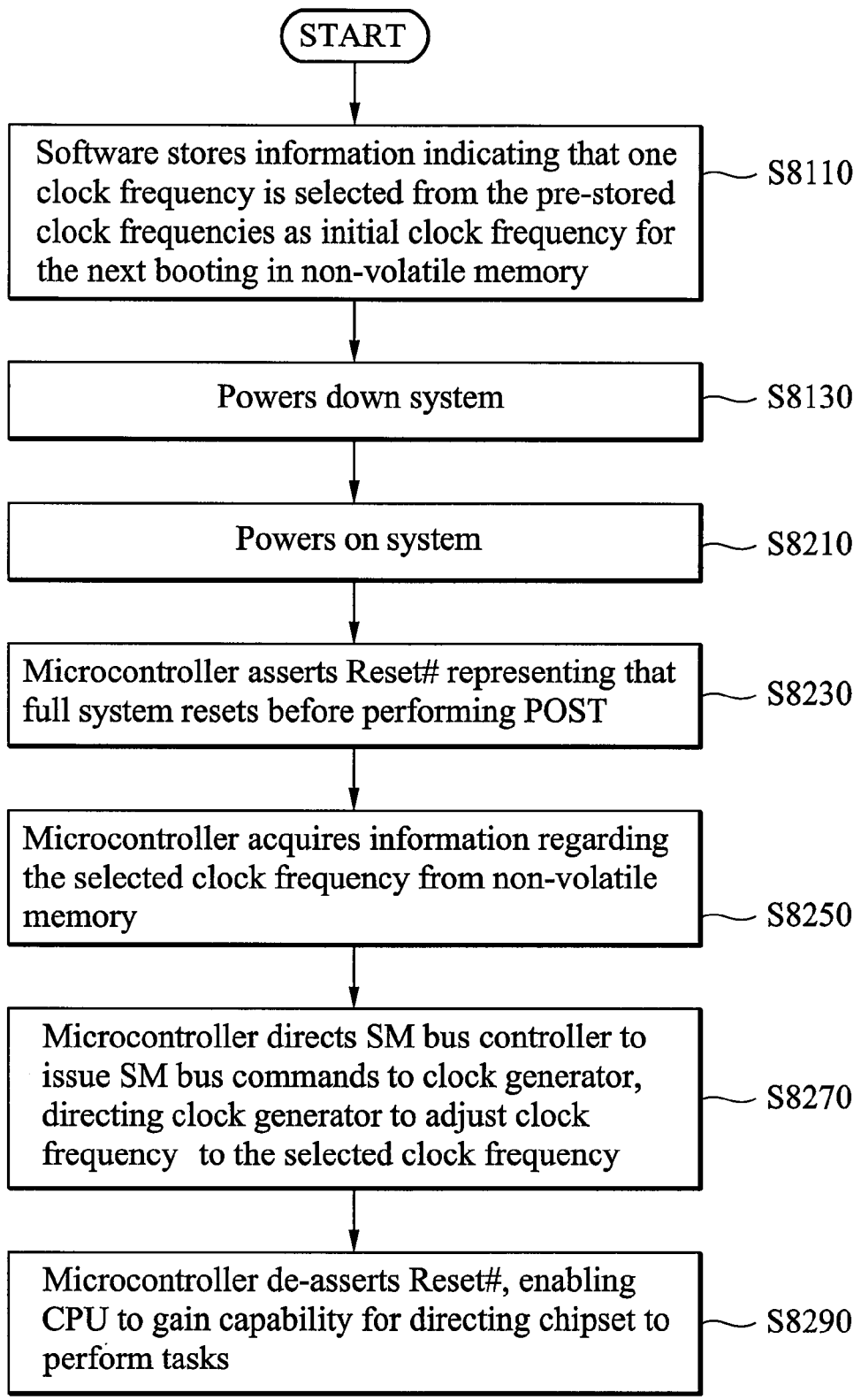
FIG. 8 is a flowchart illustrating a third embodiment of a method for adjusting clock frequency.

In a third embodiment, the non-volatile memory 1700 (FIG. 1) stores a number of clock frequencies, such as 95, 100, 105, 110 and 120 MHz. The non-volatile memory 1700 may be an EEPROM (electrically erasable programmable read-only memory), a flash memory or similar. FIG. 8 is a flowchart illustrating a third embodiment of a method for adjusting clock frequency. In step S8110, information indicating that one clock frequency is selected from the pre-stored clock frequencies as an initial clock frequency for the next booting is stored in the non-volatile memory 1700 (FIG. 1) by software executed in the CPU 1300 (FIG. 1). In step S8130, the entire system is powered down. In step S8210, the entire system is powered on. In step S8230, Reset# representing that the entire system resets is asserted by the microcontroller 1533 (FIG. 1) of the south-bridge 1530 (FIG. 1) before performing POST (power on self test), to halt the CPU 1300. In step S8250, information regarding the selected clock frequency is acquired from the non-volatile memory 1700 by the microcontroller 1533. In step S8270, the SM bus controller 1531 (FIG. 1) is directed to issue a series of SM bus commands to the clock generator 1100 (FIG. 1) by the microcontroller 1533, enabling the clock generator 1100 to generate clock signals with the selected clock frequency. Note that, Reset# is continually asserted when performing steps S8250 and S8270. In step S8290, the Reset# is de-asserted by the microcontroller 1533 after completely generating clock signals with the selected clock frequency, enabling the CPU 1300 to gain capability for directing the chipset 1500 (FIG. 1) to perform tasks.

Systems and methods, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer system and the like, the machine becomes an apparatus for practicing the invention. The disclosed methods and apparatuses may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Certain terms are used throughout the description and claims to refer to particular system components. As one skilled in the art will appreciate, consumer electronic equipment manufacturers may refer to a component by different names. This document does not intend to distinguish between components that differ in name but not function.

Although the invention has been described in terms of preferred embodiment, it is not limited thereto. Those skilled in this technology can make various alterations and modifications without departing from the scope and spirit of the invention. Therefore, the scope of the invention shall be defined and protected by the following claims and their equivalents.

What is claimed is:

1. A method for adjusting clock frequency, comprising:
setting a first timer;
activating the first timer, enabling the first timer to start countdown halting a central processing unit (CPU) before the first timer reaching zero; and
after detecting that the first timer reaches zero, adjusting a first clock frequency to a second clock frequency after detecting that the first timer reaches zero.

2. The method as claimed in claim 1 wherein the clock signals are utilized in synchronization operations among the CPU, a north-bridge and a south-bridge.

3. The method as claimed in claim 1 wherein, when halting the CPU, the CPU is unable to issue commands to a chipset.

4. The method as claimed in claim 1 wherein the first timer is set to a relevant time to ensure that the CPU can be successfully halted before the first timer reaches zero.

5. The method as claimed in claim 1 further comprises:
setting a second timer;
activating the second timer when or after adjusting the first clock frequency to the second clock frequency, enabling the second timer to start countdown; and
triggering an interrupt to wake-up the CPU after detecting that the second timer reaches zero.

6. The method as claimed in claim 5 wherein the second timer is set to a relevant time to ensure that the first clock frequency can be successfully adjusted to the second frequency before the second timer reaches zero.

7. The method as claimed in claim 1 further comprises:
setting a second timer;
activating the second timer when or after activating the first timer, enabling the second timer to start countdown; and
triggering an interrupt to wake-up the CPU after detecting that the second timer reaches zero.

8. The method as claimed in claim 7 wherein the second timer is set to a relevant time to ensure that the CPU can be successfully halted and the first clock frequency can be successfully adjusted to the second frequency before the second timer reaches zero.

9. The method as claimed in claim 1 wherein the halting step further comprises:
asserting a Reset#representing that full system resets before performing POST (power on self test) to halt the CPU;
acquiring information regarding that the clock frequency is selected from a non-volatile memory while asserting the Reset#; and
generating a plurality of clock signals with the selected clock frequency while asserting the Reset#.

10. The method as claimed in claim 9 wherein the halting step further comprises de-asserting the Reset#after generating the clock signals with the selected clock frequency, enabling the CPU to issue commands to a chipset.

11. A computer system, comprising:
a central processing unit (CPU);
a microcontroller coupled to the CPU;
a basic input output system (BIOS);
a clock generator;
a first timer; and
a system management (SM) bus controller;
wherein the CPU executes the BIOS; the BIOS sets the first timer, issues a clock frequency adjust command to the microcontroller after setting the first timer, and halts the CPU after issuing the clock frequency adjust command; and the microcontroller activates the first timer and enables the first timer to start countdown after receiving the clock frequency adjust command, and directs the SM bus controller to issue a series of SM bus commands to the clock generator after detecting that the first timer reaches zero to direct the clock generator to adjust a first clock frequency to a second clock frequency, wherein the CPU is halted before the first timer reaching zero.

12. The system as claimed in claim 11 wherein the CPU is unable to issue commands to the chipset when the CPU is halted.

13. The system as claimed in claim 11 wherein the first timer is set to a relevant time to ensure that the CPU can be successfully halted before the first timer reaches zero.

14. The system as claimed in claim 11 further comprises a second timer, the microcontroller activates the second timer when or after directing the SM bust controller to issue the SM bus commands, enabling the second timer to start countdown, and triggers an interrupt to wake-up the CPU after detecting that the second timer reaches zero.

15. The system as claimed in claim 14 wherein the second timer is set to a relevant time to ensure that the first clock frequency can be successfully adjusted to the second frequency before the second timer reaches zero.

16. The system as claimed in claim 11 further comprises a second timer, the BIOS sets the second timer when setting the first timer, and the microcontroller activates the second timer when or after activating the first timer, enabling the second timer to start countdown, and triggers an interrupt to wake-up the CPU after detecting that the second timer reaches zero.

17. The system as claimed in claim 16 wherein the second timer is set to a relevant time to ensure that the CPU can be successfully halted and the first clock frequency can be successfully adjusted to the second frequency before the second timer reaches zero.

18. The system as claimed in claim 11 further comprising a non-volatile memory and a clock generator and a system management (SM) bus controller, the microcontroller asserts a Reset#representing that resets the computer system before performing a POST procedure (power on self test), enabling to halt the CPU, acquires information that the clock frequency is selected from the non-volatile memory while asserting the Reset#, and directs the clock generator to generate a plurality of clock signals with the selected clock frequency via the SM bus controller while asserting the Reset#.

19. The system as claimed in claim 18 wherein the microcontroller de-asserts the Reset#after generating the clock signals with the selected clock frequency, enabling the CPU to issue commands to the chipset.

* * * * *